United States Patent Office 3,220,861
Patented Nov. 30, 1965

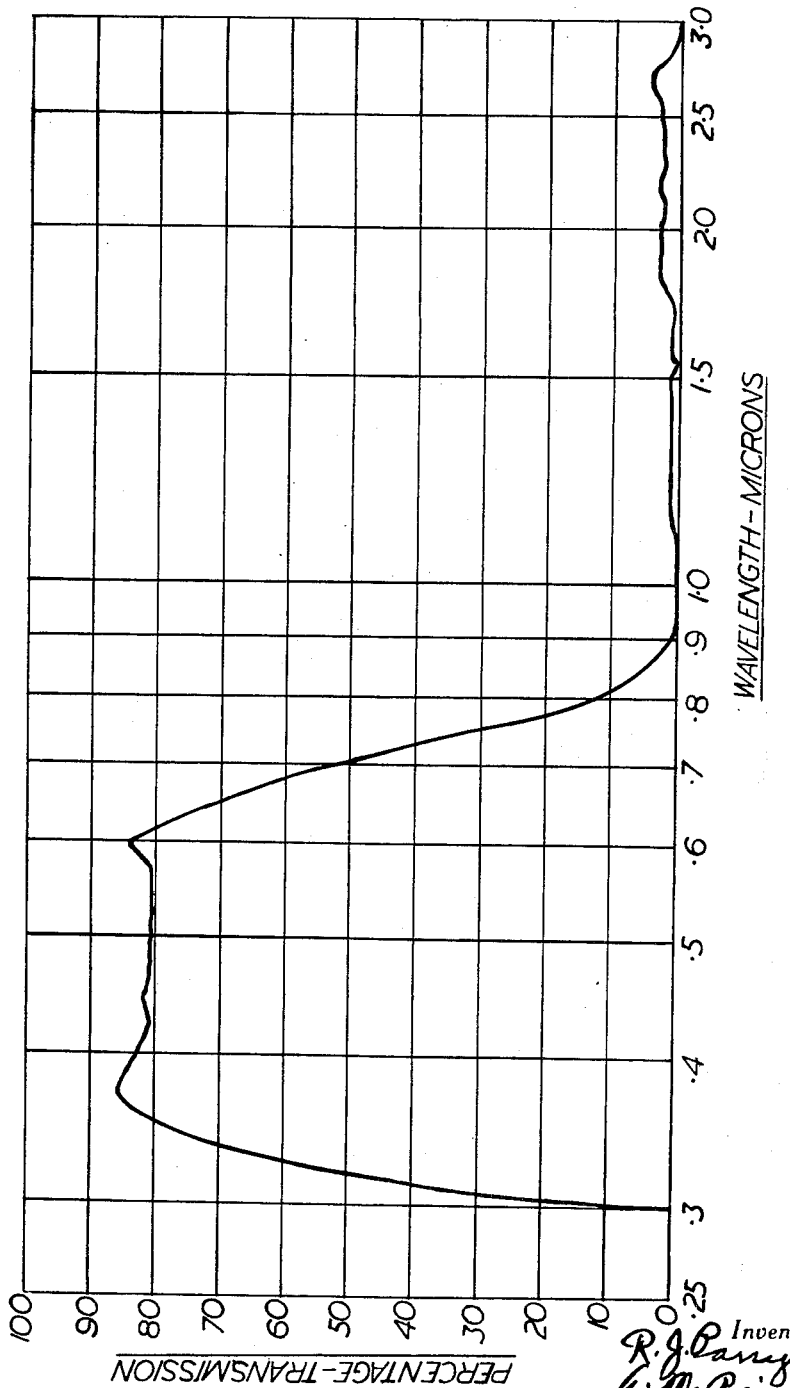

3,220,861
MANUFACTURE OF HEAT ABSORBING GLASSES
Richard John Parry, Tawd Bridge, and Alexander Mailer Reid, St. Helens, England, assignors to Pilkington Brothers Limited, Liverpool, England, a company incorporated of Great Britain
Filed Nov. 6, 1962, Ser. No. 235,744
Claims priority, application Great Britain, Nov. 6, 1961, 39,726/61
2 Claims. (Cl. 106—47)

This invention relates to the manufacture of heat absorbing glasses and to the heat absorbing glasses so produced.

It is a main object of the present invention to provide a heat absorbing glass, that is to say a glass capable of absorbing a high proportion of electromagnetic radiations of wavelengths in excess of 0.75 micron, the glass also being capable of transmitting a substantial proportion of electromagnetic radiations in the visible range.

A glass manufactured according to the present invention is characterised by a content by weight from 63.5% to 74.4% of phosphorus pentoxide ($P_2O_5$), from 1.6% to 9.2% of boric oxide ($B_2O_3$), from 7.4% to 10% of magnesium oxide (MgO), from 6.4% to 7.7% of calcium oxide (CaO), from 2.9% to 6.5% of aluminum oxide ($Al_2O_3$), and from 2.0% to 2.2% of iron oxide (expressed as $Fe_2O_3$), the total content of the magnesium oxide and calcium oxide together being from 14.2% to 17.4% by weight of the glass, and the glass being obtained by fusion under reducing conditions.

Experiments have shown that the manufacture of heat absorbing glass having the desired transmission properties is facilitated when the glass which is manufactured has ranges of constituents as specified. In particular, glasses according to the invention have improved liquidus temperatures, that is to say lower liquidus temperatures than are found in other heat absorbing glasses, so that the batch from which the glass is formed does not have to be heated to such a high temperature in order to form the molten glass.

Glass according to the present invention may additionally contain by weight from 0% to 2% of silica ($SiO_2$) and from 0% to 5% of barium oxide (BaO). The presence of these other components is desired in some circumstances to improve some physical properties of the glass, for example, the silica will increase the viscosity of the glass, while the barium oxide reduces the rate of crystal growth.

It is also found that glasses according to the present invention have good chemical durability, and, even without the presence of any barium oxide, lower rates of crystal growth than other heat absorbing glasses. The presence of a small percentage of zinc oxide will improve the chemical durability of the glass still further.

Desirably, a glass according to the present invention is obtained by the fusion under reducing conditions of a batch composition consisting essentially of magnesium dihydrogen phosphate, calcium dihydrogen phosphate, aluminum metaphosphate, boron phosphate and ferric oxide.

Preparation of glass according to the present invention may also be undertaken by fusing under reducing conditions a batch composition consisting essentially of phosphoric acid and oxides of magnesium (MgO), calcium (CaO), aluminum ($Al_2O_3$), boron ($B_2O_3$) and iron (expressed as $Fe_2O_3$).

The iron component of the glass may be included in the glass batch in the form of iron filings, ferric oxide, ferrous oxalate or any suitable iron compound, together with a reducing agent such as sugar, starch, tartaric acid or ammonium salts, etc., in the batch. A reducing atmosphere over the glass throughout the melting period is essential.

The glasses are preferably made from a dry batch of the appropriate phosphates in order to cut down loss of phosphorus pentoxide during melting and for ease of handling and mixing. The rate of melting is also improved and the wear on refractories is reduced.

The following is given as a specific example of a manner of producing a phosphate glass according to the present invention, which glass is capable of transmitting a substantial proportion of electromagnetic radiations of wavelengths in the visible spectrum and capable of absorbing a high proportion of electromagnetic radiations of wavelengths in excess of 0.75 micron.

A glass batch containing magnesium dihydrogen phosphate, calcium dihydrogen phosphate, aluminum metaphosphate, boron phosphate and ferric oxide was heated in a fused silica container under reducing conditions, for example an atmosphere of carbon monoxide or hydrogen. The batch in the fused silica container is maintained at a temperature of about 1300° C. until the batch was completely fused. For a 5 lb. batch, the period necessary to complete melting is approximately 2 hours and the molten glass is then fined and cast into a mould at a temperature of 600° C. and is annealed by cooling slowly from a temperature of 600° C. to room temperature, for example at 1.5° C. per minute.

Although the temperature of 1300° C. has been mentioned for the temperature of fusing of the glass batch, it will be appreciated that this temperature may be anywhere within a range from about 1200° C. to about 1400° C. depending upon the components of the batch being fused. If the batch contains a high aluminum content, the temperatures at the upper end of this temperature range are necessary.

In order that the present invention may be more fully understood, there are listed in the following table by way of illustration, preferred compositions of certain examples of heat absorbing glass according to the invention, the proportions being percentages by weight:

| No. | $P_2O_5$ | $B_2O_3$ | MgO | CaO | $Al_2O_3$ | $Fe_2O_3$ | $SiO_2$ | BaO | L.T. ° C. |
|---|---|---|---|---|---|---|---|---|---|
| 1 | 65.0 | 9.2 | 7.8 | 6.4 | 4.5 | 2.1 | | 5.0 | 970 |
| 2 | 64.8 | 8.6 | 7.8 | 6.4 | 5.3 | 2.1 | | 5.0 | 940 |
| 3 | 63.5 | 7.9 | 7.8 | 6.4 | 5.4 | 2.0 | 2.0 | 5.0 | 1,000 |
| 4 | 70.3 | 6.9 | 7.9 | 7.4 | 5.4 | 2.1 | | | 976 |
| 5 | 66.7 | 8.8 | 7.4 | 7.5 | 5.6 | 2.0 | 2.0 | | 993 |
| 6 | 70.4 | 6.9 | 8.6 | 7.4 | 4.6 | 2.1 | | | 955 |
| 7 | 70.6 | 7.0 | 10.0 | 7.4 | 2.9 | 2.1 | | | 985 |
| 8 | 70.9 | 6.8 | 7.7 | 7.2 | 5.3 | 2.1 | | | 965 |
| 9 | 70.2 | 5.7 | 9.2 | 7.4 | 5.4 | 2.1 | | | 980 |
| 10 | 73.2 | 3.1 | 8.2 | 7.7 | 5.6 | 2.2 | | | 910 |
| 11 | 74.4 | 1.6 | 8.9 | 6.6 | 6.5 | 2.0 | | | 930 |

The single figure of the accompanying drawing comprises a graph showing a typical spectral transmission curve for a filter made from a glass according to the present invention. The curve shown in the drawing is the spectral transmission curve for a filter of thickness 4 mms.

made from the glass of Example 9 and it will be seen that, even though the percentage transmission of radiations of wavelength of 0.75 micron and greater is very small, the filter still permits the transmission of a very high percentage of the radiations in the visible range.

As typical examples of the qualities of glass according to the invention, the following figures are given for the transmission through glasses of 4 mm. thickness in accordance with the present invention:

| Example No. | Total Transmission of Visible Wavelengths | Total Transmission of Wavelengths of 1 micron and greater |
|---|---|---|
| 1 | 82.6 | 6.9% |
| 2 | 84.1 | 8.0% |
| 3 | 82.8 | 8.7% |
| 4 | 83.5 | 6.4% |

The present invention also comprehends filters made from glasses as hereinbefore described.

We claim:
1. Glass having a liquidus temperature not exceeding 1000° C. and consisting essentially of by weight from 63.5% to 74.4% of phosphorus pentoxide ($P_2O_5$), from 1.6% to 9.2% of boric oxide ($B_2O_3$), from 7.4% to 10% of magnesium oxide (MgO), from 6.4% to 7.7% of calcium oxide (CaO), from 2.9% to 6.5% of aluminum oxide ($Al_2O_3$), and from 2.0% to 2.2% of iron oxide ($Fe_2O_3$), the total content of the magnesium oxide and calcium oxide together being from 14.2% to 17.4% by weight of the glass, and the iron oxide being present in the glass largely in the ferrous state.

2. Glass having a liquidus temperature not exceeding 1000° C. and consisting essentially of by weight from 63.5% to 74.4% of phosphorus pentoxide ($P_2O_5$), from 1.6% to 9.2% of boric oxide ($B_2O_3$), from 7.4% to 10% of magnesium oxide (MgO), from 6.4% to 7.7% of calcium oxide (CaO), from 2.9% to 6.5% of aluminum oxide ($Al_2O_3$), from 0% to 2% of silica ($SiO_2$), from 0% to 5% of barium oxide (BaO) and from 2.0% to 2.2% of iron oxide ($Fe_2O_3$), the total content of the magnesium oxide and calcium oxide together being from 14.2% to 17.4% by weight of the glass and the iron oxide present in the glass having a very high ratio of ferrous oxide and ferric oxide.

References Cited by the Examiner
UNITED STATES PATENTS

| | | | |
|---|---|---|---|
| 1,749,823 | 3/1930 | Long | 106—47 |
| 1,961,603 | 6/1934 | Berger | 106—47 |
| 2,294,844 | 9/1942 | Gelstharp | 106—47 |
| 2,423,128 | 7/1947 | Tillyer | 106—47 |
| 2,434,281 | 1/1948 | Moulton | 106—47 |
| 2,486,811 | 11/1949 | Weyl | 106—47 |
| 3,113,033 | 12/1963 | Hoxie et al. | 106—47 |

TOBIAS E. LEVOW, *Primary Examiner.*